2 Sheets—Sheet 1.

H. H. DE PEW.

CONVERTIBLE CHAIR.

No. 10,779. Reissued Nov. 2, 1886.

Witnesses
P. E. Rumemo.
W. C. Collier

Inventor
Henry H. De Pew
By Coburn & Thacher
Attorneys

2 Sheets—Sheet 2.

H. H. DE PEW.

CONVERTIBLE CHAIR.

No. 10,779. Reissued Nov. 2, 1886.

Witnesses
P. E. Reinemo
H. C. Corlies

Inventor
Henry H. De Pew
By Coburn & Thacher
Attorneys

UNITED STATES PATENT OFFICE.

HENRY H. DE PEW, OF MAQUOKETA, IOWA.

CONVERTIBLE CHAIR.

SPECIFICATION forming part of Reissued Letters Patent No. 10,779, dated November 2, 1886.

Original No. 300,928, dated June 10, 1884. Application for reissue filed May 18, 1885. Serial No. 165,943.

*To all whom it may concern:*

Be it known that I, HENRY H. DE PEW, a citizen of the United States, and a resident of Maquoketa, in the county of Jackson and State of Iowa, have invented certain new and useful Improvements in Convertible Chairs, which are fully set forth in the following specification, reference being had to the accompanying drawings, in which—

Figure 1:
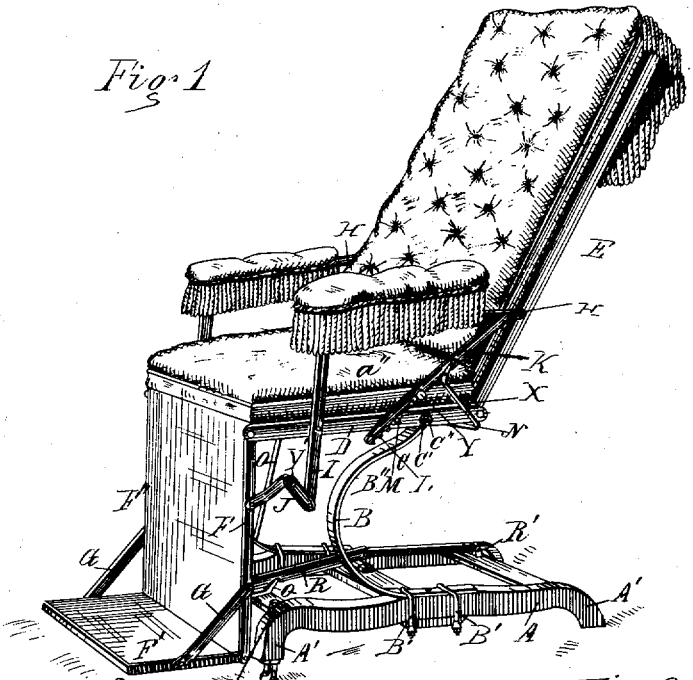
Figure 7:
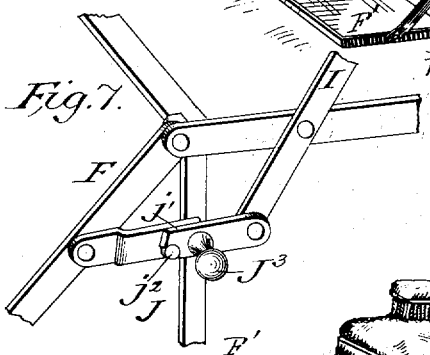
Figure 8:
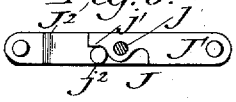
Figure 2:
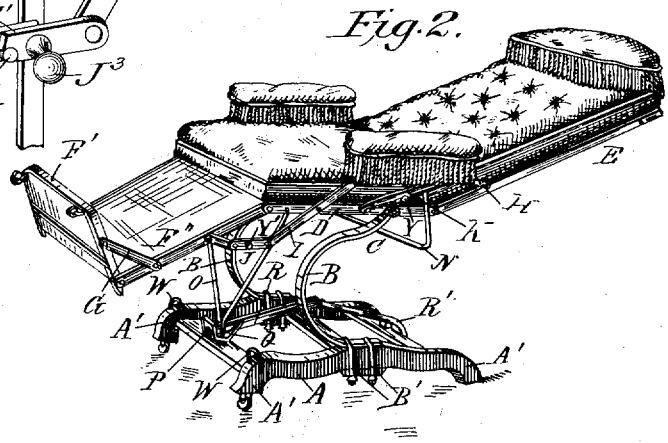
Figure 3:
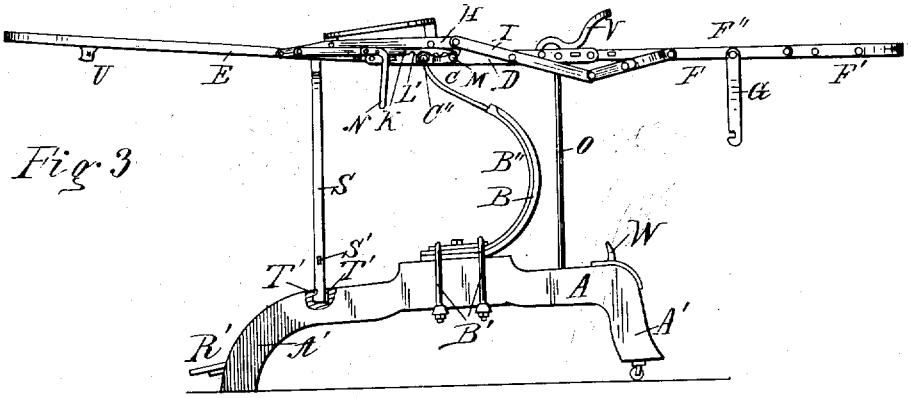
Figure 4:
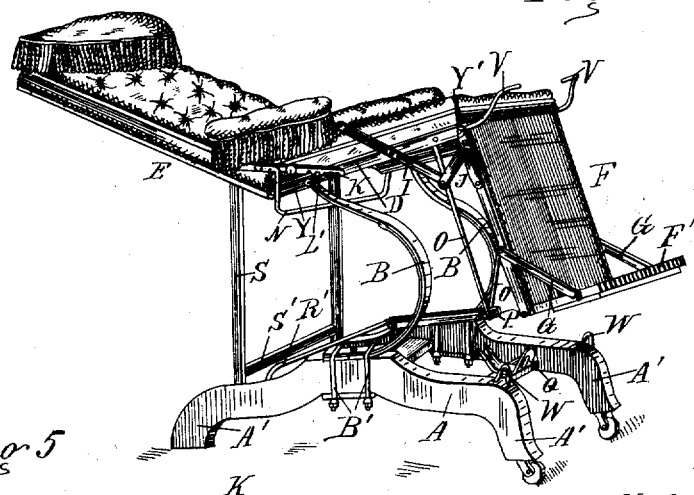
Figure 5:
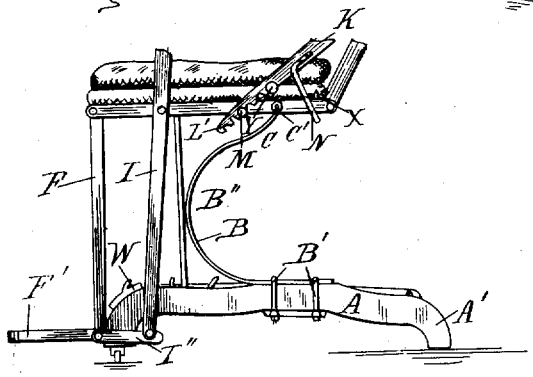
Figure 6:
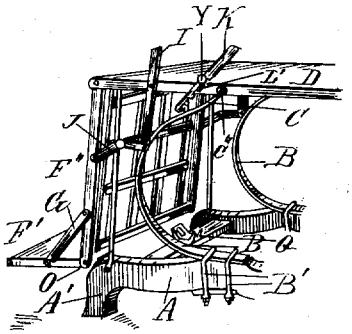

Figure 1 is a perspective view of my improved convertible chair, showing the same in an upright position. Fig. 2 is a similar view of the chair held in a reclining position by the adjustable fastenings. Fig. 3 is a side view showing the chair in a position to be used as a surgeon's operating-table. Fig. 4 is a perspective view of the chair in position for gynecological or other similar operations. Fig. 5 is a side view of a modification of my invention. Fig. 6 is a perspective view of a modification of my invention, and Figs. 7 and 8 are detail views which will be hereinafter referred to.

Similar letters of reference indicate corresponding parts in all the figures.

My invention has relation to convertible chairs; and it consists in the improved construction and combination of parts of a chair which may be adjusted so as to adapt it to be used either as an easy-chair or as a surgeon's operating chair or table, as will be hereinafter more fully described and claimed.

In the accompanying drawings, A represents a square or rectangular frame provided with suitable legs or feet, A′, which forms the base of my chair. Upon the sides of this frame are clamped two springs, B, by clamps or clips B′ B′, rendering the lower ends of these springs adjustable forward or backward, as may be found necessary, to properly balance the chair upon its base. The springs B are carried forward a short distance, and then bent back upon themselves in a large semicircle, as seen at B″, the upper ends of the springs having a slight reverse curve upward, as seen at C, and terminating in eyes C′, in which is journaled a cross-bar or round, C″, upon which the seat of the chair A″ is secured.

D D indicate the side pieces of the chair-seat, to the rear ends of which are pivoted the lower ends of the frame E, forming the back of the chair, while to the front ends of the side pieces, D D, are pivoted the upper ends of the frame F, forming the foot-rest. The lower part, F′, of the foot-rest is held at right angles to the upper part, F″, of the same by means of braces G, which may be thrown out of connection when desired, in order to allow the lower part of the foot-rest to be straightened out in a line with the upper part when the chair is extended to adapt it to be used as a surgeon's operating-table.

H indicates the arm-rests, each of which is pivoted at its rear end to the side frame of the chair-back E, and at its front end to an upright bar, I, which is pivoted at its center to the side frame of the chair-seat D, and to the lower end of which (bar I) is pivoted the end of a hinged bar, J, the front end of which is pivoted to the side frame of the upper part of the foot-rest F. The bars J are each constructed in two parts hinged to each other in such a manner that the said bars may yield or be flexed upward, as shown in Figs. 1 and 4 of the drawings, the hinged joint between the two being of such a construction, however, as to prevent their yielding downward beyond a certain point. There are various forms of joints in common use, which may be employed for this purpose; but the form which I prefer is that shown in the present instance, reference being had more particularly to Figs. 7 and 8 of the drawings, in which each bar J is shown as composed of two parts, J′ and $J^2$, connected by a pivot, $j$, the part J′ being provided with a projection, $j'$, and the part $J^2$ being provided with a projection or pin, $j^2$, upon which the projection $j'$ rests when the two parts of the bar are in the position shown in the drawings. A knob or handle, $J^3$, is attached to one of the parts, by means of which the bar may be bent upward, for the purposes hereinafter described.

K represents ratchet-bars, each of which is pivoted at one end to the rear part of the arm-rest H, and is provided on its lower edge with a series of teeth, L′, which are adapted to engage with a stud, M, projecting from the side pieces of the seat-frame D. The teeth L′ are beveled or cut away on their front edges to adapt them to slide over the studs M when the chair is raised into an upright position, while the rear edges of the teeth are made perfectly straight to adapt them to hold the chair firmly against backward pressure. The ratchet-bars K are connected together by a curved rod, N, so that by moving one ratchet-bar to adjust it the other will be adjusted at the same time.

O O represent curved supporting-bars, the upper diverging ends of which are pivoted to either side of the seat D, while their lower converging ends have secured between them a cross-head, P, the front end of which is adapted to enter a slot in an upwardly-projecting plate, Q, secured to the front cross-piece of the frame A.

To the rear end of the cross-head P is pivoted the forward end of the hinged rod or lever R, supported in suitable bearings upon the rear cross-piece of the frame A. When the hinged rod R is extended in a straight line, which is its normal position, it serves to hold the cross-head P in its locked position, while by pressing with the foot upon the downwardly-curved rear end, R′, of the said rod, the cross-head P will be freed from the slotted plate Q, in order to allow the chair to be swung back into the position shown in Fig. 4 of the drawings.

S S represent supporting rods or legs, which are connected together by a cross-piece, S′, and are pivoted at their upper ends to either side of the frame of the chair-back. The lower ends of the legs S fit within the recesses T in the side pieces of the frame A, and are provided with notches T′, which serve as catches to hold the said legs in their locked position. The legs S S are for the purpose of acting as an additional support when the chair is adjusted to act as a surgeon's operating chair or table, and when not in use may be folded up against the back of the chair, where they are held by a turn-button, U.

V represents stirrups, which are pivoted to either side of the chair-seat, near its forward end, and which are used for holding or resting the feet in gynecological or other similar operations, the stirrups being folded back under the cushions when not in use.

W W indicate upwardly-projecting pieces upon the forward part of the frame A, against which the foot-rest bears when the chair is in its upright position.

X X indicate turn-buttons, which may be turned to lock the back of the chair in a line with the seat when the chair is extended to form a surgeon's operating-table. The ratchet-bars K and the hinged rods J are provided with knobs or handles Y Y′, by which they may be conveniently operated.

From the foregoing description, taken in connection with the accompanying drawings, the construction of my improved convertible chair will readily be understood without requiring further explanation.

It will be seen that my improved chair is simple in construction, and, being devoid of all complicated parts, is not liable to break or get out of order. By throwing back the back of the chair the foot-rest will be elevated, as will readily be understood by reference to the drawings, while by moving the back forward the foot-rest will be lowered in a similar manner. This movement of the foot-rest, in conjunction with the movement of the back, will, however, only take place when the two parts of the bar J are in line with each other or depressed in the position shown in Figs. 7 and 8 of the drawings, in which position they act as a rigid bar connecting the bars or levers H to the foot-rest frame F. When the bars are raised in the position shown in Figs. 1 and 4 of the drawings, the foot-rest will of course remain in its normal position during any movement of the back and the arm rest H and bars J connected thereto, the motion of these parts being taken up by means of the hinged connection between the two portions of the bars J in an obvious manner. The curved and pivoted bars O O serve as an additional support for the chair when the latter is in an upright position, while by means of the hinged lever R, the cross-head P can be disengaged from the slotted plate Q, when it is desired to swing the chair into the position shown in Fig. 4 of the drawings. The other parts of the chair operate in the manner previously described.

For the treatment of uterine displacement and hernia the patient is placed in the chair, which is then inclined to any desired point—for instance, to the position shown in Fig. 4—when the attendant, taking hold of the back of the chair, gives it a backward and forward motion. The bending of the supporting-springs B B under this motion and the weight of the patient also gives the chair an up-and-down movement, this combined motion, more or less powerfully applied, being just what is required to reduce the uterine displacement or hernia and restore the displaced parts to their normal position.

It will be seen that my improved convertible chair can be used as an upright easy-chair, a reclining-chair, a surgeon's operating chair or table for the treatment of uterine displacement and hernia, for gynecological operations, and as a single or double chair or seat in railway-cars or theaters.

When it is desired to use the chair as an easy-chair for railway-cars or for theaters, the lower converging ends of the curved supporting-bars O O may be rigidly fastened to the center of the front cross-beam of the frame A, or the said supporting-bars may be made perfectly straight and fastened to the side pieces of the frame A, as shown in Fig. 6 of the drawings.

If desired, the upright bar I may be extended down to a level with the bottom of the foot-rest, and connected thereto by a plain bar, I″, as is clearly shown in the modification, Fig. 5, of the drawings. When so constructed the brace G is dispensed with.

I am aware of Letters Patent No. 215,871, granted May 27, 1879, to F. Bohsert, and Letters Patent No. 242,733, granted June 7, 1881, to A. C. Yenglin, and I do not wish to be understood as claiming anything set forth in said Letters Patent.

I am also aware that it is not broadly new, in convertible chairs of this general description, to operate the two ratchet-bars simultaneously, mechanism for effecting this purpose being shown in Letters Patent No. 298,065, granted May 6, 1884, to Lewis Bush, Jr., and I therefore do not wish to be understood as claiming the same, broadly.

Having thus described my invention, I claim and desire to secure by Letters Patent of the United States—

1. In a convertible chair, the combination, with the seat having hinged thereto the back and foot rest, of the arm rests H, pivoted to the back, bars I, pivoted to the seat at or near their centers and to the arm-rests H at their upper ends, and connected at their lower ends to the foot-rest by bars J, constructed in two parts hinged together, substantially as described.

2. The combination of the base A, springs B, secured thereto and supporting the chair-seat near its rear end, and supporting bars O O, attached to the chair-seat near its front end and to the side pieces of the frame A, substantially as and for the purposes specified.

3. The combination, with base A, having suitable supports, of the chair-seat pivoted to said supports, supporting-bars O, attached to said seat and having a cross-head, P, adapted to engage with a slotted plate, Q, on the base, and hinged lever R, mounted on the base and pivoted to the bars O, substantially as and for the purposes specified.

HENRY H. DE PEW.

Witnesses:
D. H. ANDERSON,
W. L. SHRIGLEY.